United States Patent [19]
Koike

[11] Patent Number: 5,274,788
[45] Date of Patent: Dec. 28, 1993

[54] HIGH SPEED MEMORY ACCESS FOR A DATA PROCESSOR

[75] Inventor: Tsuneo Koike, Tokyo, Japan

[73] Assignee: NEC Corporation, Tokyo, Japan

[21] Appl. No.: 659,957

[22] Filed: Feb. 26, 1991

[30] Foreign Application Priority Data

Feb. 26, 1990 [JP] Japan .................... 2-46089

[51] Int. Cl.$^5$ .................... G06F 12/00; G06F 13/00
[52] U.S. Cl. .................... 395/425; 364/DIG. 1; 364/966.3; 364/251.7; 365/230.03
[58] Field of Search .................... 395/425; 365/230.03, 365/230.04; 364/DIG. 1, DIG. 2, 251.7, 966.3

[56] References Cited

U.S. PATENT DOCUMENTS

| | | | |
|---|---|---|---|
| 4,378,594 | 3/1983 | Kenyon | 395/425 |
| 4,438,512 | 3/1984 | Hartung et al. | 371/60 |
| 4,740,911 | 4/1988 | Shar et al. | 364/900 |
| 4,918,587 | 4/1990 | Pechter | 364/200 |
| 5,089,993 | 2/1992 | Neal et al. | 365/230.03 |

FOREIGN PATENT DOCUMENTS

3228967 3/1982 Fed. Rep. of Germany.

OTHER PUBLICATIONS

IBM Technical Disclosure Bulletin, vol. 22, No. 11, Split Cache with Variable Interleave Boundary, Apr. 1980 pp. 5183-5186.

Primary Examiner—Alyssa H. Bowler
Attorney, Agent, or Firm—Whitham & Marhoefer

[57] ABSTRACT

A data processor which includes a central processing unit (CPU) coupled to an address bus for supplying an address to an external memory and a data bus for supplying data to the external memory and receiving data from the external memory, and a control logic for controlling data exchange between the CPU and the external memory with a predetermined unit amount of data processing of the central processing unit. The external memory includes first and second DRAMs and the CPU executes the data exchange with units of four words. Each DRAMs has a memory area divided into a number of sub-areas each have four continuous addresses, so that the sub-areas of the first DRAM and the sub-area of the second DRAM are alternately assigned in continuous addresses in one memory space formed of the first and second DRAMs. When an continuous addresses are supplied, a controller controls so that the first and second DRAMs are alternately accessed.

3 Claims, 12 Drawing Sheets

FIGURE 8

| INPUT | | | OUTPUT | | | |
|---|---|---|---|---|---|---|
| $\overline{G}$ | B | A | $\overline{Y_0}$ | $\overline{Y_1}$ | $\overline{Y_2}$ | $\overline{Y_3}$ |
| 0 | 0 | 0 | 0 | 1 | 1 | 1 |
| 0 | 0 | 1 | 1 | 0 | 1 | 1 |
| 0 | 1 | 0 | 1 | 1 | 0 | 1 |
| 0 | 1 | 1 | 1 | 1 | 1 | 0 |
| 1 | 0 | 0 | 1 | 1 | 1 | 1 |
| 1 | 0 | 1 | 1 | 1 | 1 | 1 |
| 1 | 1 | 0 | 1 | 1 | 1 | 1 |
| 1 | 1 | 1 | 1 | 1 | 1 | 1 |

HIGH SPEED MEMORY ACCESS FOR A DATA PROCESSOR

BACKGROUND OF THE INVENTION

1. Field of the Invention

The present invention relates to a data processor, and more specifically to a method of locating and controlling a memory device provided in the data processor.

2. Description of Related Art

A typical conventional data processor includes a central processing unit (CPU) for executing data processing. The CPU is coupled to an address bus used to supply an address to an external device and a data bus for transferring data between the CPU and the external device. In addition, the CPU is coupled to a control bus used for controlling the external device. One typical CPU is adapted to handle a memory space in such a manner that a plurality of consecutive memory areas are treated as a one block. In this CPU, a width of an internal data bus is larger than a width of an external data bus. Therefore, a plurality of external bus cycles can be generated in response to one internal bus cycle. This type of CPU can be exemplified by Intel's microprocessor i8088 and a CPU including a cache controller therein. As known, the cache controller has adopted a data exchange procedure in which a memory space is divided into a plurality of blocks, and data exchange or transfer between a cache memory and an external memory is collectively executed in units of blocks.

In addition, the data bus is coupled to a plurality of DRAMs (dynamic random access memory), which constitute external memories for the CPU. Each of the DRAMs is controlled by one corresponding DRAM controller coupled to the address bus. Each DRAM controller is controlled by a control logic which is coupled to the CPU through a control bus in order to interface an operating timing between the control bus and the external device such as the DRAMs and the DRAM controller. Typically, the control logic supplies a common memory read signal and a common memory write signal to all the DRAM controllers. The DRAM controllers are also controlled by a decoder coupled to the address bus so that one of the DRAM controllers is selectively activated in response to a chip select signal generated by the decoder on the basis of the result of decoding of an address on the address bus.

The DRAM is configured to be capable of executing a high speed page mode operation, in which if a row address does not change, a data exchange can be executed by changing only a column address and activating a column address strobe again. In a normal access mode, a row address and a column address are applied to the DRAM by executing an address input by two times. Therefore, since the input of the row address is unnecessary, the data exchange can be correspondingly executed at a high speed.

On the other hand, the DRAM has one restriction in which once a row address strobe is activated, a precharge period in which the row address strobe is made inactive is required. If the precharge period is not satisfied, a content of the DRAM will be lost.

Now, assuming that the address bus is composed of 32 bits, and two 1M DRAMs are used, an address of 0000 0000$_h$ to 000F FFFF$_h$ is assigned to a first DRAM, and an address of 0010 0000$_h$ to 001F FFFF$_h$ is assigned to a second DRAM, in a memory map of the data processor. Here, the suffix "h" means a hexadecimal notation. In addition, the CPU can access to the external device with units of block each of which includes a plurality of units of processing, similarly to the type including the cache memory therein. Here, the unit of processing is called a "word". For example, one block includes four words.

Under the above mentioned conditions, an operation of the conventional data processor will be discussed. At a T1 clock of a first bus cycle, an address is supplied to the address bus, and decoded by the decoder. If the supplied address designates the first DRAM, the decoder outputs an active chip select signal to a first DRAM controller associated with the first DRAM. On the other hand, a memory access is outputted to the control bus and converted by the control logic into an active memory read signal or into an active memory write signal. Now, assume that the memory read signal has been activated.

In response to the active chip select signal and the active memory read signal, the first DRAM controller associated with the first DRAM is activated. As a result, at a falling of the T1 clock, the row address strobe supplied to the first DRAM is activated by the first DRAM controller and thereafter maintained in an active condition. Then, the first DRAM controller supplies an address signal to the first DRAM during a high level period of the T1 clock. At a rising of a T2 clock following the T1 clock, the column address strobe supplied to the first DRAM is activated, so that a content of the first DRAM is outputted to the data bus. At an end of a low level period of the T2 clock, the data exchange is completed, and a first TB clock following the T2 clock rises. The TB clock is used in the high speed page mode operation, and makes it possible to execute the data exchange with only one clock. At a rising of the first TB clock, the column address strobe supplied to the first DRAM is inactivated, and a next address is supplied to the first DRAM during a high level period of the TB clock. At a falling of the first TB clock, the column address strobe supplied to the first DRAM is activated, and the a second data exchange is executed during a low level period of the TB clock. Succeeding to the first TB clock, second and third clocks are generated so that the same memory reading operation (the data exchange) is executed three times. As a result, the data exchange is executed four times in total by the T1 and T2 clocks and the succeeding first to third TB clocks.

Following the first bus cycle, a second bus cycle starts, and a T1 clock of the second bus cycle rises at an end of the low level period of the third TB clock of the first bus cycle. At the T1 clock, a next address is supplied to the address bus so that a memory access will be started. However, at a falling of the T1 clock of the second bus cycle, the row column strobe supplied to the first DRAM is inactivated, and maintained in an inactive condition for a period corresponding to one clock period, since a period for the precharging is required to have one clock period. As a result, the row column strobe supplied to the first DRAM is activated at a falling of the T2 clock of the second bus cycle. Namely, the starting of the memory access in the second bus cycle is delayed from the starting of the memory access in the first bus cycle by a period of time corresponding to one clock. Because of this, a TW clock is inserted between the T2 clock and the first TB clock in the second bus cycle, so that the CPU is brought into a wait condition so as to adjust the timing. This adjustment is controlled by the control logic.

As seen from the above, when the same bank of the memory is continuously accessed by the CPU, the data exchange, which will be completed with five clocks in ordinary cases, requires six clocks. As a result, the processing capacity of the data processor will correspondingly decrease. If first and second accesses are made to different banks, respectively, a second access can be completed with five clocks. However, considering a processing situation of the CPU, an instruction reading operation is of course executed for consecutive memory banks, and data processed by the CPU is collectively stored in some region of the memory (localization of access region). Therefore, the possibility of access to the same bank is higher than the possibility of access to different banks. As a result, opportunity of the six clock access is much.

The above mentioned operation time was made on the basis of clocks. In fact, however, various operating timings of different DRAMs coupled to the CPU must be satisfied. For example, an access period of time from the activation of the column address strobe until the completion of the data exchange must be ensured. Therefore, if the processing capacity of the data processor is increased by increasing the frequency of the clock, the operation based on the T1 and T2 clocks can be adjusted by inserting the TW clock for waiting, but it is not possible to adjust the operation of the TB clock by inserting the TW clock. As a result, there occurs a situation in which the operating timing (for example, the access period of time starting from the activation of the column address strobe) cannot be satisfied. In this situation, the data processor cannot properly operate.

In addition, the DRAM has rapid access mode such as the high speed page mode which is higher than the ordinary access operation. However, ROMs (read only memory) and SRAMs (static random access memory) always require the same access time. In the case that these memories are coupled to the CPU, if the CPU is adapted to execute a first memory access by the T1 and T2 clocks and each of succeeding memory accesses by one TB clock as in the conventional example explained hereinbefore, it is requires that the memory access can be completed by only one clock. As a result, expensive ROMs or SRAMs are required.

Furthermore, if ROMs or SRAMs are used, these memory resources are often located at the outside of the cache coverage. In addition, it is necessary to generate various control signals so that the data exchange between the DRAM and the CPU is executed in the high speed access mode (T1, T2, TB, TB and TB clocks) and the data exchange between the ROM or SRAM and the CPU is executed in a normal access mode (four sets of T1 and T2 clocks). However, if the ROMs or SRAMs are located at the outside of the cache coverage, the performance of the data processor inevitably degrades. If the CPU operates in different modes, the control circuit becomes complicated.

SUMMARY OF THE INVENTION

Accordingly, it is an object of the present invention to provide a data processor which has overcome the above mentioned defect of the conventional one.

Another object of the present invention is to provide a data processor capable of continuously accessing the same region of an external device with the same period of time as that required when a different region is accessed.

Still another object of the present invention is to provide a data processor capable of accessing a low access speed external device apparently as quick as the data processor accesses a high access speed external device.

The above and other objects of the present invention are achieved in accordance with the present invention by a data processor comprising a CPU and a memory accessed by the CPU, the memory being divided into a plurality of memory banks in such a manner that a size of one block that can be accessed by the CPU is assigned to one memory bank, the CPU generating a control signal for locating the memory banks in an interlaced or interleaved manner, one of the memory bank including a plurality of memory sub-banks, and the CPU generating another control signal for sequentially executing a data exchange between the CPU and the memory sub-banks.

The above and other objects, features and advantages of the present invention will be apparent from the following description of preferred embodiments of the invention with reference to the accompanying drawings.

BRIEF DESCRIPTION OF THE DRAWINGS

FIG. 8 is a truth table illustrating an operation of the selector shown in FIG. 7;

DESCRIPTION OF THE PREFERRED EMBODIMENTS

Figure 1:
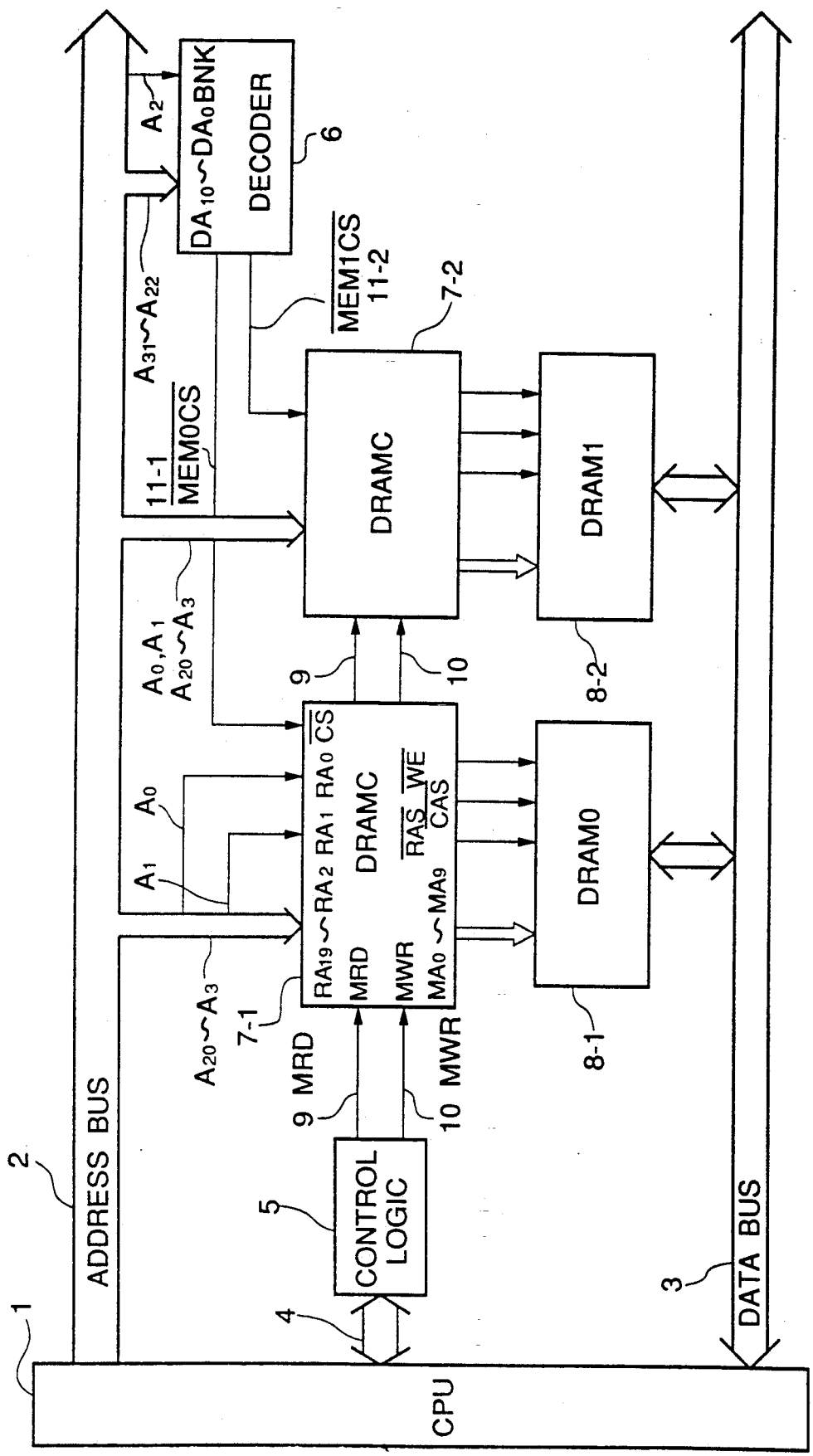
FIG. 1 is a block diagram of a first embodiment of the data processor in accordance with the present invention.

Referring to FIG. 1, there is shown a block diagram of a first embodiment of the data processor in accordance with the present invention.

The shown data processor includes a central processing unit (CPU) 1 for executing data processing. The CPU is coupled to an address bus 2 used to supply an address to an external device and a data bus 2 for transferring data between the CPU and the external device. In the shown embodiment, the address bus 2 has a width of 32 bits, and respective bits of the address bus are designated by $A_0, A_1, \ldots, A_{31}$, where the suffix added to the letter "A" shows a bit position. Here, the CPU has a width of an internal data bus which is larger than a width of an external data bus. Therefore, a plurality of external bus cycles can be generated in response to one internal bus cycle. As mentioned hereinbefore, this type of CPU can be exemplified by Intel's microprocessor i8088 and a CPU including a cache controller therein.

In addition, the data bus 3 is coupled to a plurality of DRAMs 8-1 DRAM0 and 8-2 DRAM1, which constitute external memories for the CPU. DRAM0 8-1 and DRAM1 8-2 are controlled by DRAM controllers (DRAMC) 7-1 and 7-2 coupled to the address bus 2. Each of the DRAM controller 7-1 and 7-2 is controlled by a control logic 5 which is coupled to the CPU through a control bus 4 in order to interface an operating timing between the control bus 4 and the external device such as the DRAMs and the DRAM controller. The control logic 5 supplies a common memory read signal MRD 9 and a common memory write signal MWR 10 to all the DRAM controllers 7-1 and 7-2 in parallel. The DRAM controllers are also controlled by an address decoder 6 coupled to the address bus 2. The address decoder 6 decodes a portion of an address on the address bus 2 and generates chip select signals $\overline{MEM0CS}$ and $\overline{MEM1CS}$, which are supplied to a chip selection input $\overline{CS}$ of the DRAM controllers 7-1 and 7-2, respectively. Here, the chip select signals $\overline{MEM0CS}$ and $\overline{MEM1CS}$ are an active low signal in which the signal is active when it is of "0" and inactive when it is of "1". In this specification, an upper bar means an active low signal.

The control logic 5 receives a bus cycle request from the CPU 1 through the control bus 4, and activates the memory read signal MRD 9 if the memory read is requested, and the memory write signal MWR 10 if the memory write is requested. In addition, when the memory (the external device to the CPU) completes the data exchange, the control logic 5 notifies it to the CPU 1 through the control bus 4.

Figure 11:
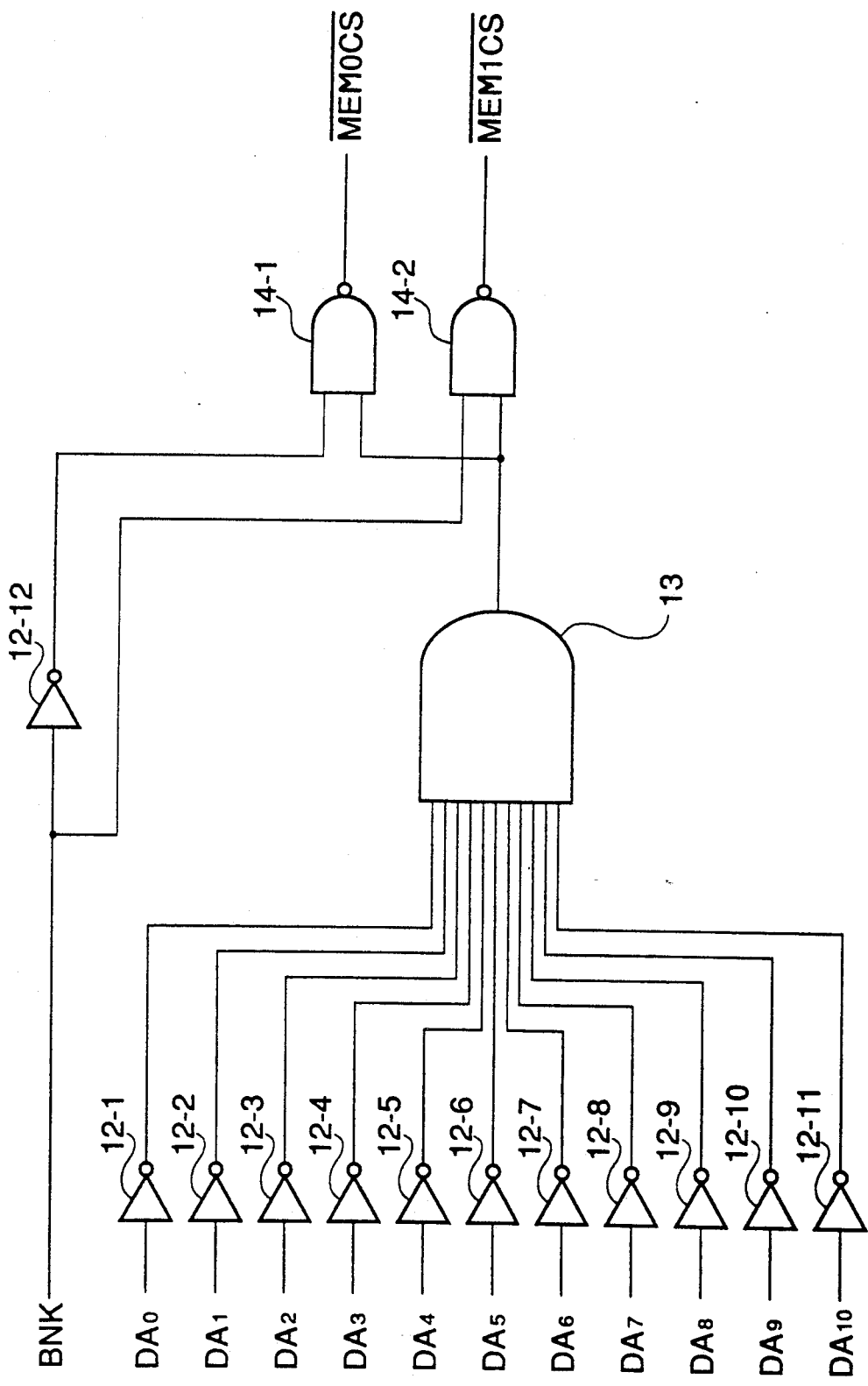
FIG. 11 is a logic diagram of the address decoder shown in FIG. 1.

For example, the address decoder 6 is constituted of inverters 12-1 to 12-12, 11-input AND gate 13 and 2-input NAND gates 14-1 and 14-2, connected as shown in FIG. 11. Address inputs $DA_0$ to $DA_{10}$ are respectively supplied through the inverters 12-1 to 12-11 to the AND gate 13, whose output is connected to the NAND gates 14-1 and 14-2. A Bank input BNK is supplied through the inverter 12-12 to the NAND gate 14-1 and directly to the NAND gate 14-2. With this arrangement, if all of address inputs $DA_0$ to $DA_{10}$ are of "0" and the BNK input is also of "0", the NAND gate 14-1 activates the chip select signal $\overline{MEM0CS}$. When all of address inputs $DA_0$ to $DA_{10}$ are of "0" and the BNK input is of "1", the NAND gate 14-2 activates the chip select signal $\overline{MEM1CS}$.

The DRAM controllers 7-1 and 7-2 have the same construction, and therefore, inputs and outputs are shown only for the DRAM controller 7-1. When a chip select input $\overline{CS}$ is active and when either the memory read signal MRD 9 or the memory write signal MWR 10 is active, the DRAM controller operates to control the associated DRAM. The DRAM controller has address inputs $RA_0$ to $RA_{19}$, and operates to supply the address inputs $RA_{10}$ to $RA_{19}$ (often called a "row address") to address outputs $MA_0$ to $MA_9$, coupled to an address input port of the associated DRAM. At the same time, the DRAM controller activates the row address strobe $\overline{RAS}$. At this time, if the memory write signal MWR is active, the DRAM controller activates a write enable signal $\overline{WE}$. Thereafter, the DRAM controller operates to supply the address inputs $RA_0$ to $RA_9$ (often called a "column address") to the address outputs $MA_0$ to $MA_9$ and at the same time, activates the column address strobe $\overline{CAS}$.

Each of the DRAMs 8-1 and 8-2 is configured to be capable of executing the high speed page mode operation as already explained hereinbefore.

The above mentioned arrangement and construction are fundamentally the same as those of the conventional data processor. According to the present invention, the BNK input of the address decoder 6 is connected to the address bit $A_2$ of the address bus 2, and the address inputs $DA_0$ to $DA_{10}$ of the address decoder 6 are connected to the address bits $A_{21}$ to $A_{31}$. On the other hand, the address inputs $RA_0$ to $RA_{19}$ of each DRAM controller are connected to the address bits $A_0$, $A_1$, $A_3$ to $A_{20}$. (For reference, in a typical conventional data processor, the BNK input of the address decoder 6 is connected to the address bit $A_{20}$ of the address bus 2, and the address inputs $RA_0$ to $RA_{19}$ of each DRAM controller are connected to the address bits $A_0$ to $A_{19}$.)

Figure 2:
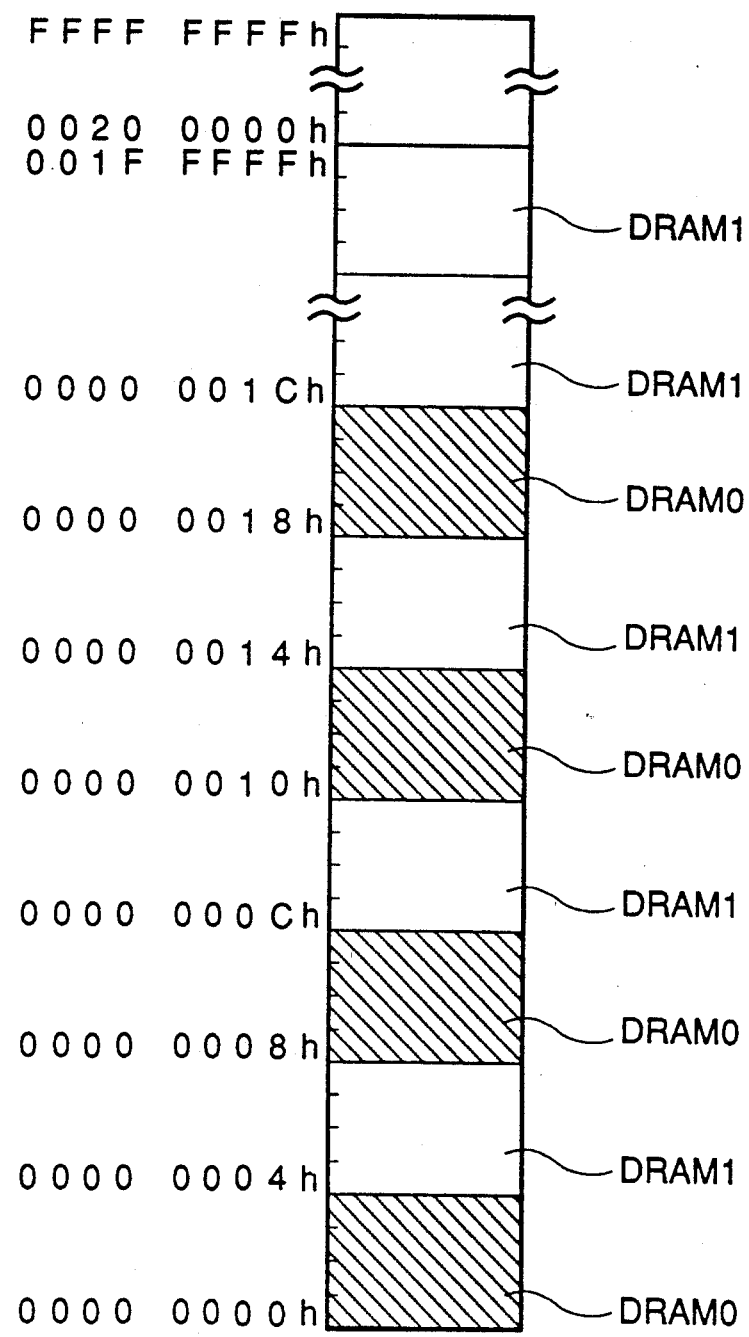
FIG. 2 shows a memory map realized in the data processor shown in FIG. 1.
Figure 12:
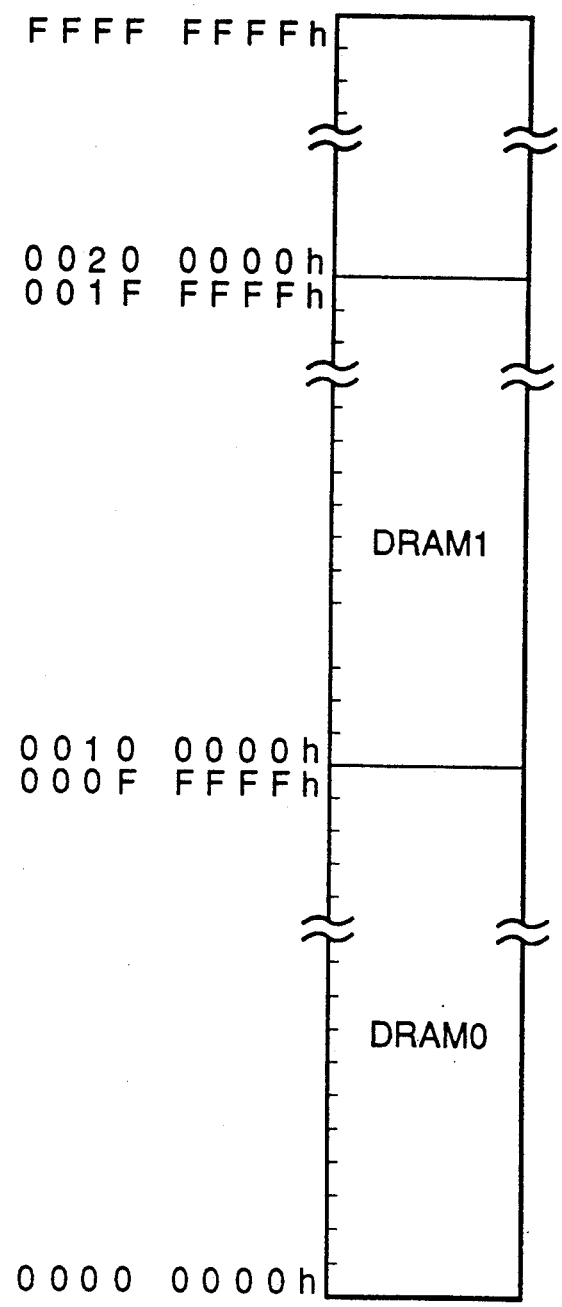
FIG. 12 shows a memory map realized in a typical conventional data processor.

Referring to FIG. 2, there is shown a memory map realized in accordance with the above mentioned connection between the address bus and the address decoder and the DRAM controllers. As shown in FIG. 2, address $00000000_h$ to $00000003_h$, $00000008_h$ to $0000000B_h$, $00000010_h$ to $00000013_h$, $00000018_h$ to $0000001B_h$, ... are assigned to the DRAM0 7-1. On the other hand, address $00000004_h$ to $00000007_h$, $0000000C_h$ to $0000000F_h$, $00000014_h$ to $00000017_h$, $0000001C_h$ to $0000001F_h$, ... are assigned to the DRAM1 7-2. Namely, the memory banks are located by units of 4 words in the interleaved manner, differently from the conventional data processor in which, for example, memory banks are continuously located as shown in FIG. 12.

Figure 3:
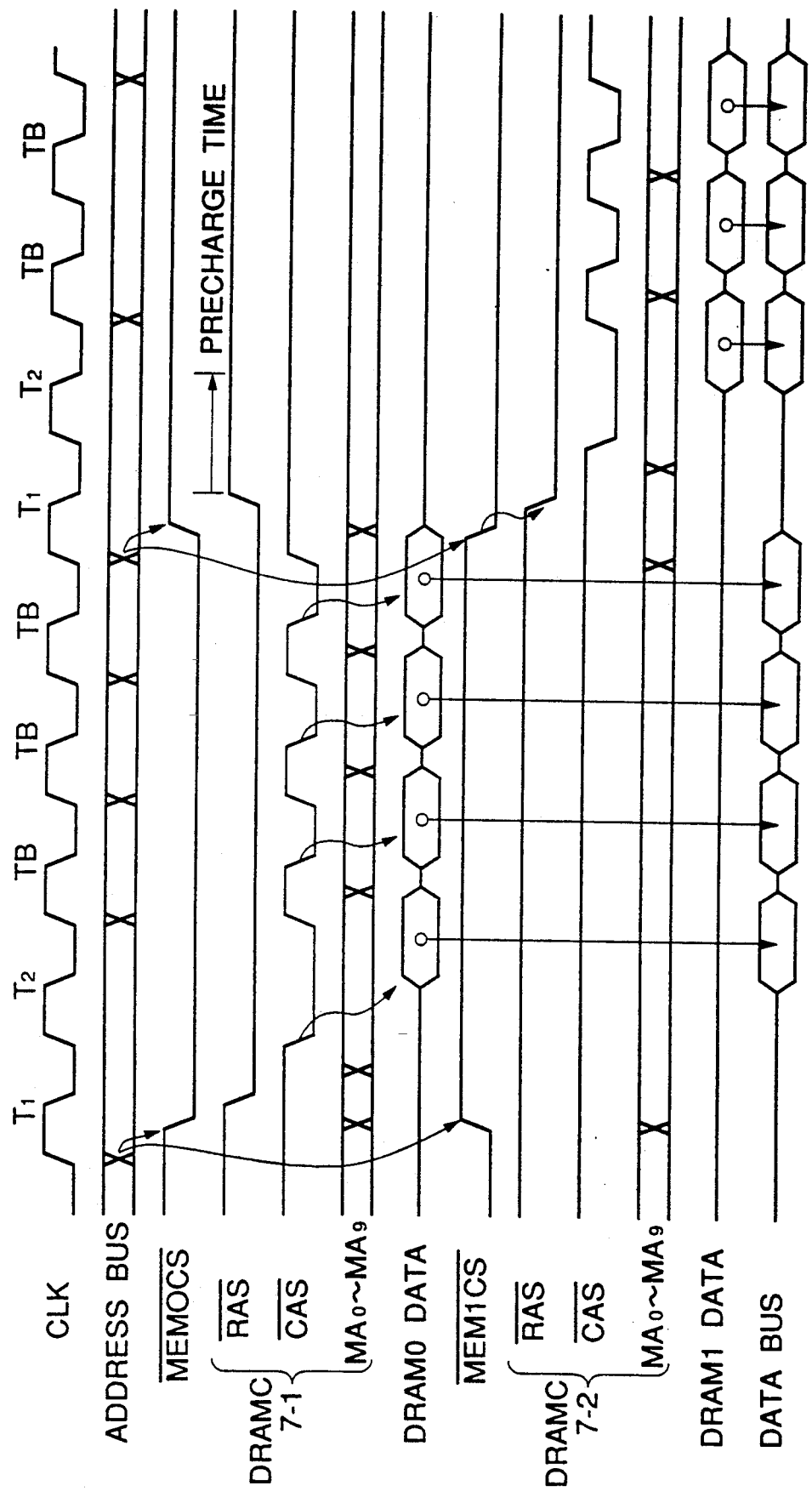
FIG. 3 is a timing chart showing an operation of the data processor shown in FIG. 1, in which two banks of memory are provided and a number of block each of which includes four words are located in the interleaved manner.

Referring to FIG. 3, there is shown a timing chart illustrating the operation of the data processor shown in FIG. 1.

Assume that the address "0" is outputted to the address bus at a T1 clock in a first cycle. The address decoder 6 decodes the address "0" and activates the chip select signal $\overline{MEM0CS}$. In response to this signal, the DRAM controller 7-1 activates the row address strobe $\overline{RAS}$ at a falling the T1 clock, so that access to the DRAM 8-1 starts. Thereafter, the row address strobe $\overline{RAS}$ is maintained in the active condition.

Then, the DRAM controller 7-1 supplies an address signal of $MA_0$ to $MA_9$ to the DRAM 8-1 during a high level period of the T1 clock. At a rising of a T2 clock following the T1 clock, the column address strobe $\overline{CAS}$ supplied to the DRAM 7-1 is activated, so that a data exchanged between the DRAM 7-1 and the CPU 1 is executed through the data bus 3. At an end of a low level period of the T2 clock, the data exchange is completed, and a first TB clock following the T2 clock rises. At a rising of the first TB clock, the column address strobe $\overline{CAS}$ supplied to the DRAM 8-1 is inactivated, and a next address of $MA_0$ to $MA_9$ is supplied to the DRAM 8-1 during a high level period of the TB clock. At a falling of the first TB clock, the column address strobe $\overline{CAS}$ supplied to the DRAM 8-1 is activated, and the a second data exchange is executed during a low level period of the TB clock. Following to the first TB clock, second and third clocks are generated so that the same memory reading operation (the data exchange) is executed three times. As a result, the data exchange is executed four times in total by the T1 and T2 clocks and the succeeding first to third TB clocks. Thus, data is read from or written to the addresses of $00000000_h$ to $00000003_h$ in the memory map shown in FIG. 2.

Now, assume that an address of "4" is outputted to the address bus 2 in a T1 clock of a second cycle succeeding to the first cycle. In this situation, the chip select signal $\overline{MEM0CS}$ is inactivated and the chip select signal $\overline{MEM1CS}$ is activated. As a result, the access to the DRAM1 8-2 is executed completely similar to the above mentioned access to the DRAM0 8-1. At this time, the DRAM controller 7-1 inactivates the row address strobe $\overline{RAS}$, so that the precharging period of time can be ensured for the DRAM0 8-1. As a result, data is read from or written to the addresses of $00000004_h$ to $00000007_h$ in the memory map shown in FIG. 2.

As seen from the above, although the data is read from or written to apparently continuous addresses in the memory, the memory access is alternately executed to the DRAM0 8-1 and the DRAM1 8-2, so that the delay of the access time caused for the precharging will not occur.

The above mentioned embodiment is such that, in the memory space, memory blocks each composed of four words are located in the interleaved manner. The reason for this is that the CPU under consideration can access four words as one block. For example, if the CPU is adapted to access sixteen words as one block, memory blocks each composed of sixteen words are located in the interleaved manner. In this case, the BNK input of the address decoder 6 is connected to the address bit $A_4$ of the address bus 2, and the address inputs $DA_0$ to $DA_{10}$ of the address decoder 6 are connected to the address bits $A_{21}$ to $A_{31}$. On the other hand, the address inputs $RA_0$ to $RA_{19}$ of each DRAM controller are connected to the address bits $A_0$, $A_1$, $A_2A_3$, $A_5$ to $A_{20}$.

Figure 4:
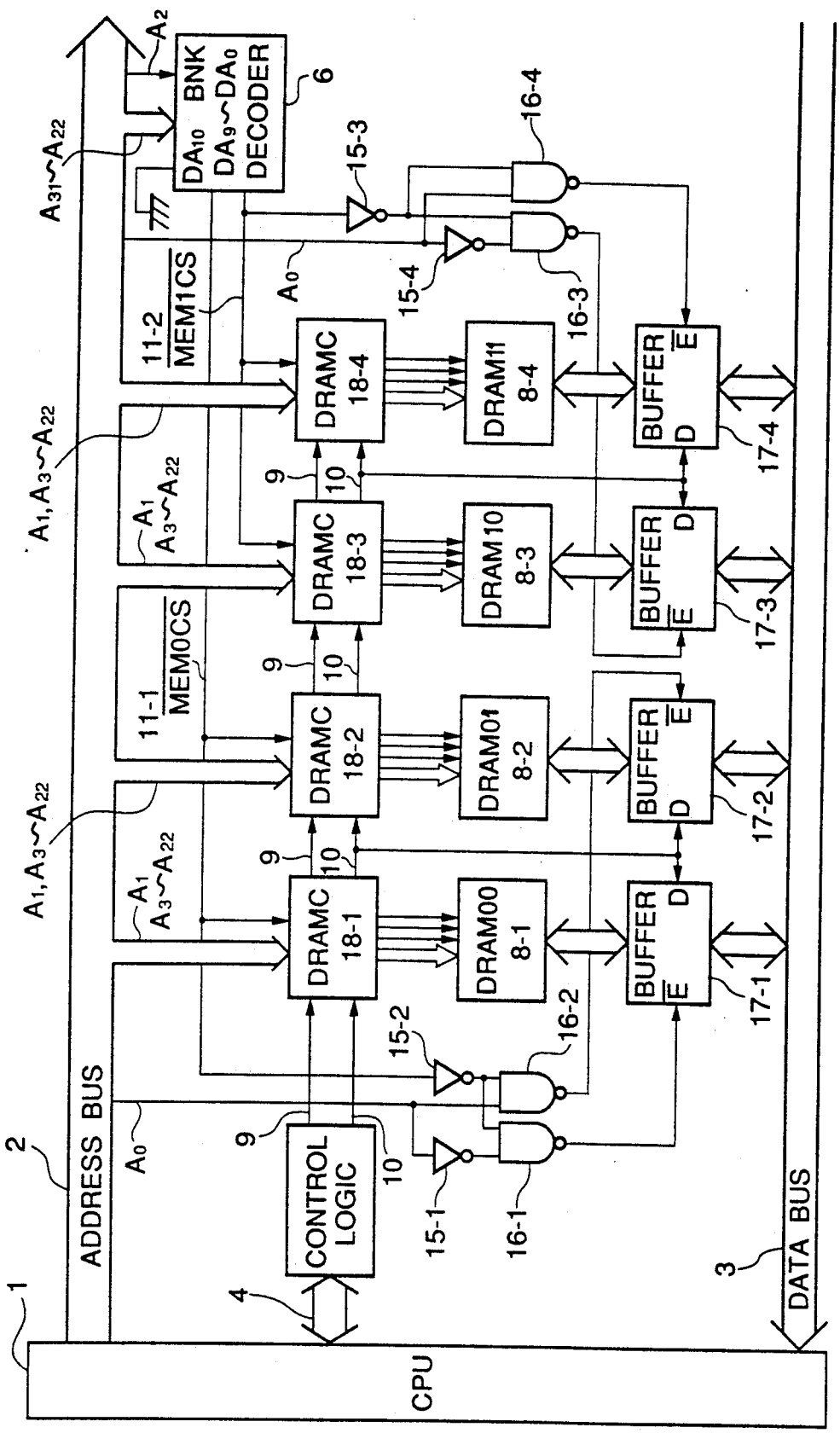
FIG. 4 is a block diagram of a second embodiment of the data processor in accordance with the present invention.

Referring to FIG. 4, there is shown a second embodiment. This second embodiment is adapted to adjust a mismatching of the operating timing with the TB clocks, which is the second problem of the prior art discussed hereinbefore.

In FIG. 4, elements similar to those shown in FIG. 1 are given the same Reference Numerals and explanation thereof will be omitted. In the second embodiment, four DRAMs 8-1 to 8-4 are provided, and each of these DRAM is similar to the DRAMs shown in FIG. 1.

The second embodiment includes inverters 15-1 to 15-4, two-input NAND gates 16-1 to 16-4, bidirectional buffers 17-1 to 17-4 having a latch function. When an input $\overline{E}$ is active, the buffer is open. On the other hand, if an input D is "1", data is supplied from the data bus 3 to the DRAM, and when the input D is "0", data is supplied from the DRAM to the data bus 3.

DRAM controllers 18-1 to 18-4 are associated to the DRAMs 8-1 to 8-4. These DRAM controllers 18-1 to 18-4 operate basically similar to a conventional DRAM controller and the DRAM controller shown in FIG. 1. However, the DRAM controllers 18-1 to 18-4 have a different high speed page mode, an operating timing of which will be explained hereinafter.

The BNK input of the address decoder 6 is connected to the address bit $A_2$ of the address bus 2, and the address inputs $DA_0$ to $DA_9$ of the address decoder 6 are connected to the address bits $A_{22}$ to $A_{31}$. The address input $DA_{10}$ of the address decoder 6 is grounded. On the other hand, the address inputs $RA_0$ to $RA_{19}$ of each of the DRAM controllers 18-1 to 18-4 are connected to the address bits $A_1$ and $A_3$ to $A_{20}$.

The $\overline{E}$ input of the buffer 17-1 is connected to receive an output of the NAND gate 16-1 receiving an output of the inverter 15-2 receiving the $\overline{MEM0CS}$ signal and an output of the inverter 15-1 receiving the address bit $A_0$. The $\overline{E}$ input of the buffer 17-2 is connected to receive an output of the NAND gate 16-2 receiving the address bit $A_0$ and the output of the inverter 15-2. The $\overline{E}$ input of the buffer 17-3 is connected to receive an output of the NAND gate 16-3 receiving an output of the inverter 15-3 receiving the $\overline{MEM1CS}$ signal and an output of the inverter 15-4 receiving the address bit $A_0$. The $\overline{E}$ input of the buffer 17-4 is connected to receive an output of the NAND gate 16-4 receiving the address bit $A_0$ and the output of the inverter 15-3. On the other hand, the D input of each of the buffers 17-1 to 17-4 are connected to receive the memory write signal 10.

Figure 5:
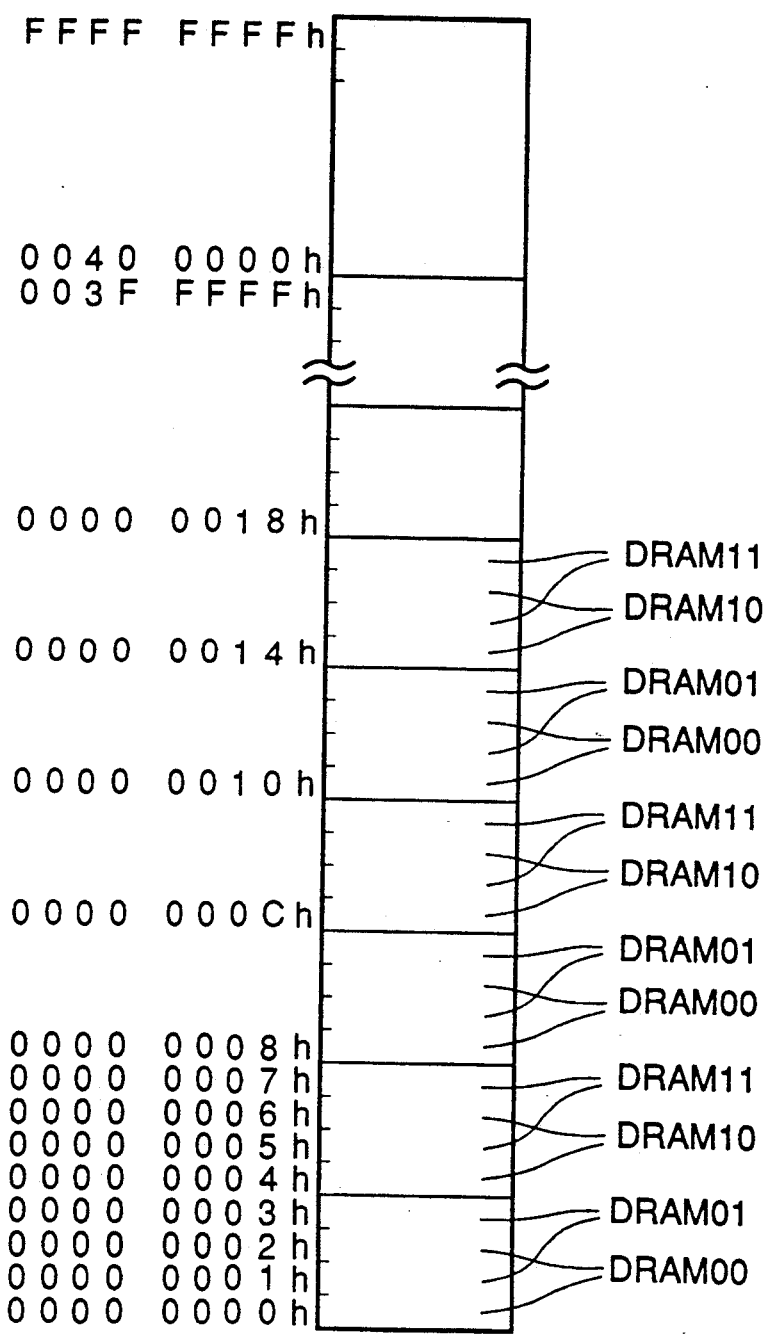
FIG. 5 shows a memory map realized in the data processor shown in FIG. 4.

Referring to FIG. 5, there is shown a memory map realized in the second embodiment. As shown in FIG. 5, addresses of $0000000_h$, $00000002_h$, $00000008_h$, $0000000A_h$, ... are assigned to the DRAM00 8-1. Addresses of $00000001_h$, $00000003_h$, $00000009_h$, $0000000B_h$, ... are assigned to the DRAM01 8-2. Addresses of $00000004_h$, $00000006_h$, $0000000C_h$, $0000000E_h$, ... are assigned to the DRAM10 8-3. Addresses of $00000005_h$, $00000007_h$, $0000000D_h$, $0000000F_h$, ... are assigned to the DRAM11 8-4.

Figure 6:
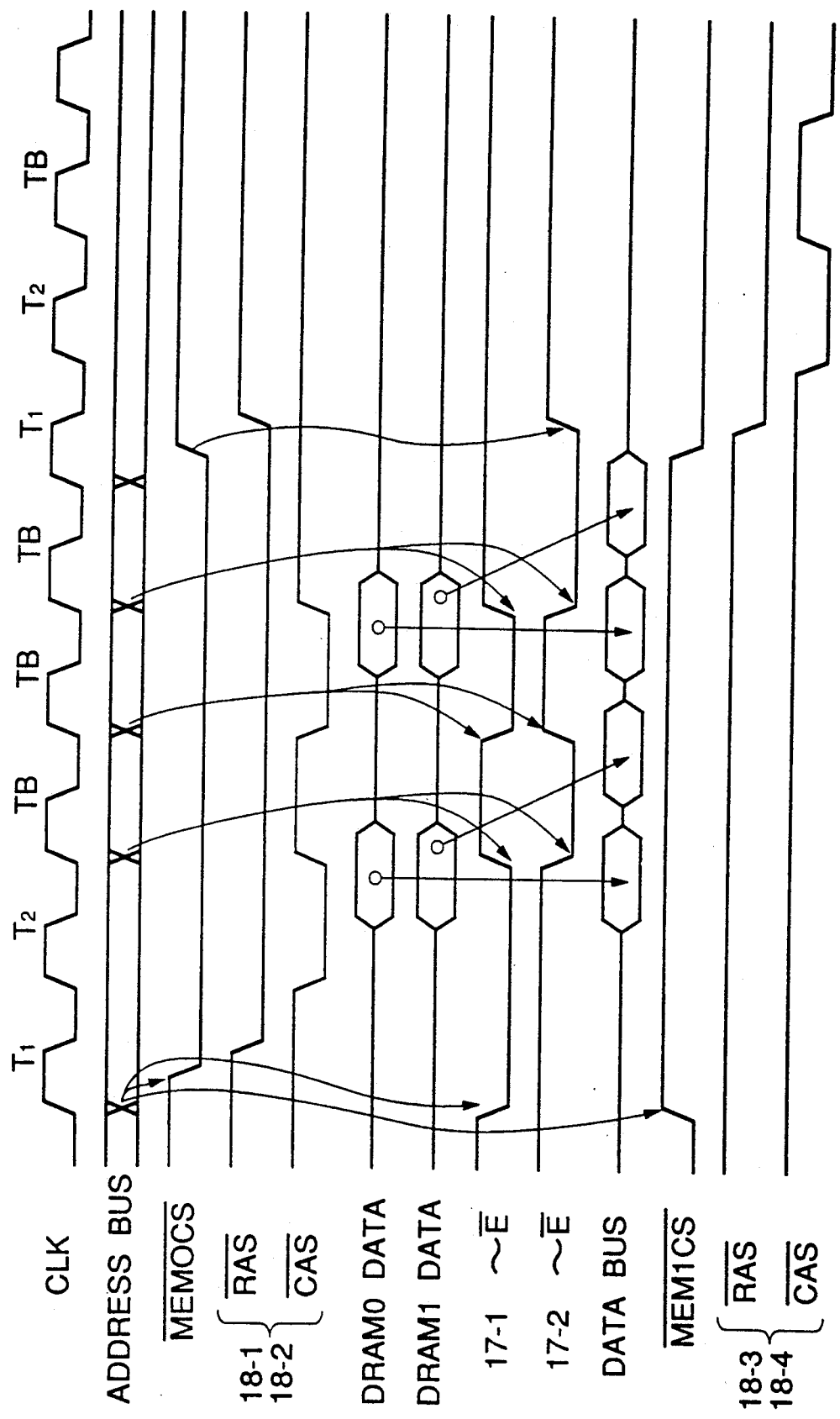
FIG. 6 is a timing chart showing an operation of the data processor shown in FIG. 4, in which four banks of memory are provided and each of the memory banks includes two sub-banks.

Referring to FIG. 6, there is shown a timing chart illustrating the operation of the second embodiment of the data processor shown in FIG. 4.

The address of the address bus changes at a T1 clock in a first cycle. If the address decoder 6 activates the chip select signal $\overline{MEM0CS}$. In response to this signal, the DRAM controllers 18-1 and 18-2 activate the row address strobe $\overline{RAS}$, so that access to the DRAM00 8-1 and DRAM01 8-2 starts. Thereafter, at a rising of a T2 clock following the T1 clock, the column address strobe $\overline{CAS}$ of the DRAM controllers 18-1 and 18-2 is activated, so that a data exchange between the DRAM00 8-1 and the DRAM01 8-2 and the CPU 1 becomes possible. At this time, the $\overline{E}$ input of the buffer 17-1 is activated, a data exchange between the DRAM00 8-1 and the CPU 1 is executed. At a first TB clock, the address changes, with the result that the $\overline{E}$ input of the buffer 17-2 is activated, a data exchange between the DRAM01 8-2 and the CPU 1 is executed. On the other hand, at a rising of the first TB clock, the column address strobe $\overline{CAS}$ is inactivated. At a rising of a second TB clock, the column address strobe $\overline{CAS}$ is activated, again. Thus, the DRAM10 and the DRAM11 sequentially execute the data exchange, similarly to the DRAM00 and the DRAM01.

After an end of the third TB clock, and at a T1 clock of a second cycle, the address changes, the chip select signal $\overline{MEM0CS}$ is inactivated and the chip select signal $\overline{MEM1CS}$ is activated. Therefore, the second embodiment can ensure the precharging time, similarly to the first embodiment.

In the second embodiment, the transition timing of the column address strobe $\overline{CAS}$ from the active condition to the inactive condition and vice versa is expanded to one clock, while the transition timing is a half clock in the first embodiment. Therefore, the controlling timing of the DRAMs is less severe, minimizing the requirements of the DRAM controllers.

Figure 7:
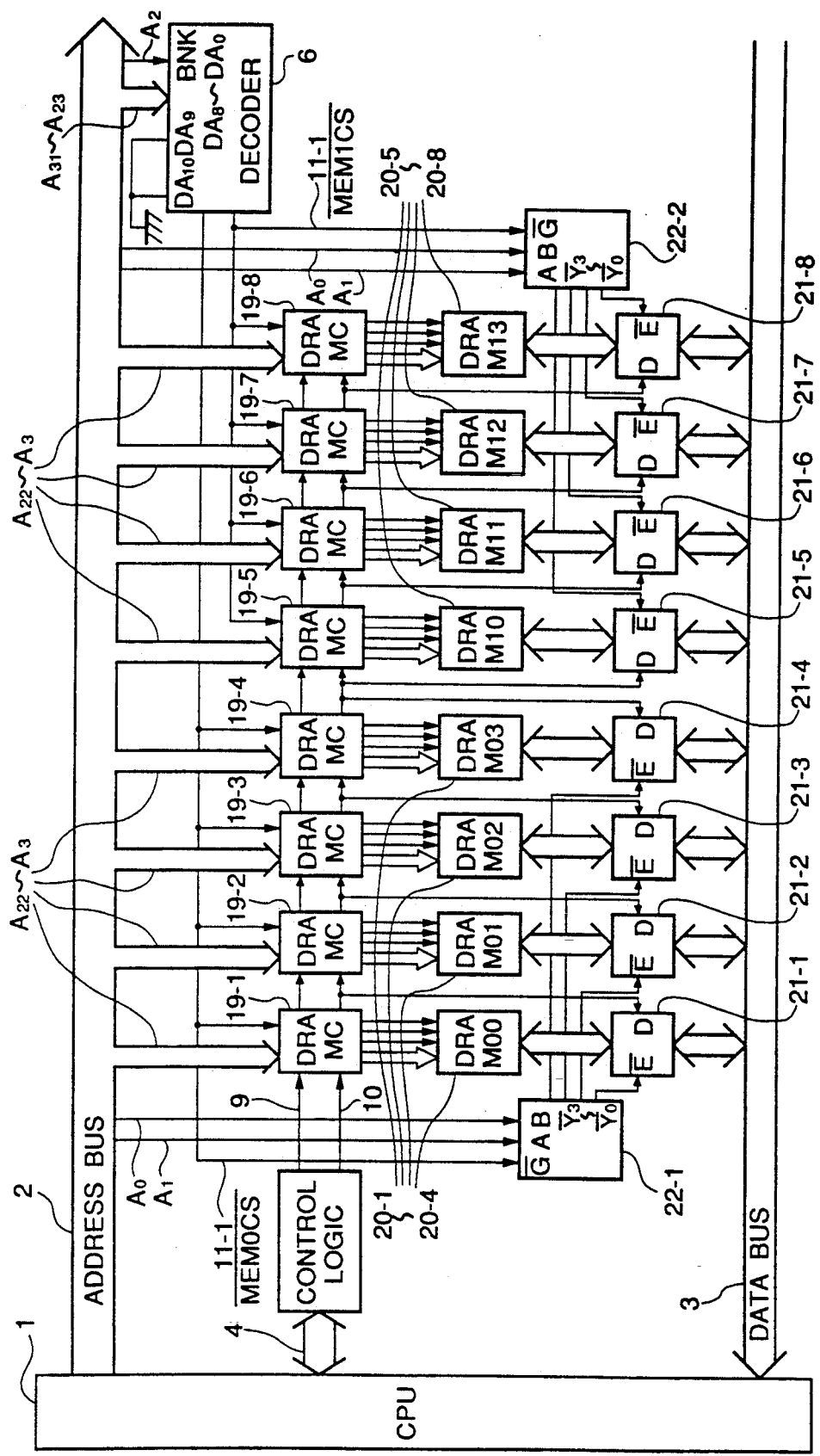
FIG. 7 is a block diagram of a third embodiment of the data processor in accordance with the present invention.

Referring to FIG. 7, there is shown a third embodiment. In FIG. 7, elements similar to those shown in FIGS. 1 and 4 are given the same Reference Numerals and explanation thereof will be omitted. In the third embodiment, the memory includes eight banks.

The third embodiment includes selectors 22-1 and 22-2. An operation of each selector is illustrated in the truth table shown in FIG. 8.

When a $\overline{G}$ input of each selector is inactive, $\overline{Y}_0$, $\overline{Y}_1$, $\overline{Y}_2$ and $\overline{Y}_3$ outputs are inactive ("1"). When the $\overline{G}$ input is active, if A and B inputs are "0, 0", $\overline{Y}_0$ is active, and if A and B inputs are "0, 1", $\overline{Y}_1$ is active. If A and B inputs are "1, 0", $\overline{Y}_2$ is active, and if A and B inputs are "1, 1", $\overline{Y}_3$ is active.

DRAM controllers 19-1 to 19-8 will be explained hereinafter when an operating timing is explained. These DRAM controllers 19-1 to 19-8 are associated to eight DRAMs 20-1 to 20-8 (DRAM00 to DRAM03 and DRAM01 to DRAM13). Buffers 21-1 to 21-8 have the same function as the buffer 17 shown in FIG. 4.

The BNK input of the address decoder 6 is connected to the address bit $A_2$ of the address bus 2, and the address inputs $DA_0$ to $DA_8$ of the address decoder 6 are connected to the address bits $A_{23}$ to $A_{31}$. The address inputs $DA_9$ and $DA_{10}$ of the address decoder 6 is grounded. On the other hand, the address inputs of each DRAM controller are connected to the address bits $A_3$ to $A_{20}$. In addition, the A and B inputs of each selector are connected to the address bits $A_0$ and $A_1$. The $\overline{G}$ input of the selector 18-1 is connected to receive the $\overline{MEM0CS}$ signal, and the $\overline{G}$ input of the selector 18-2 is connected to receive the $\overline{MOM1CS}$ signal.

Figure 9:
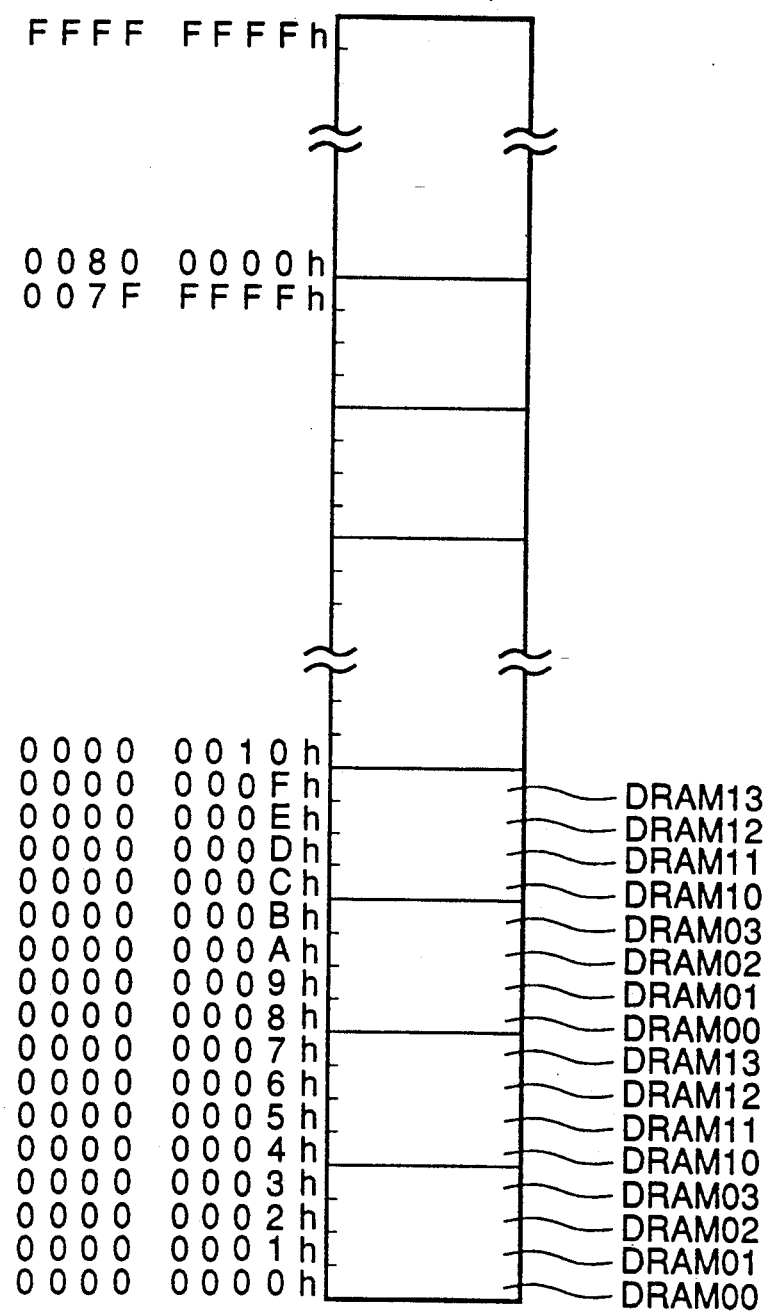
FIG. 9 shows a memory map realized in the data processor shown in FIG. 7.

Referring to FIG. 9, there is shown a memory map realized in the third embodiment. As shown in FIG. 9, addresses of $00000000_h$, $00000008_h$, ... are assigned to the DRAM00. Addresses of $00000001_h$, $00000009_h$, ... are assigned to the DRAM01. Addresses of $00000002_h$, $0000000A_h$, ... are assigned to the DRAM02. Addresses of $00000003_h$, $0000000B_h$, ... are assigned to the DRAM03. Addresses of $00000004_h$, $0000000C_h$, ... are assigned to the DRAM10. Addresses of $00000005_h$, $0000000D_h$, ... are assigned to the DRAM11. Addresses of $00000006_h$, $0000000E_h$, ... are assigned to the DRAM12. Addresses of $00000007_h$, $0000000F_h$, ... are assigned to the DRAM13.

Figure 10:
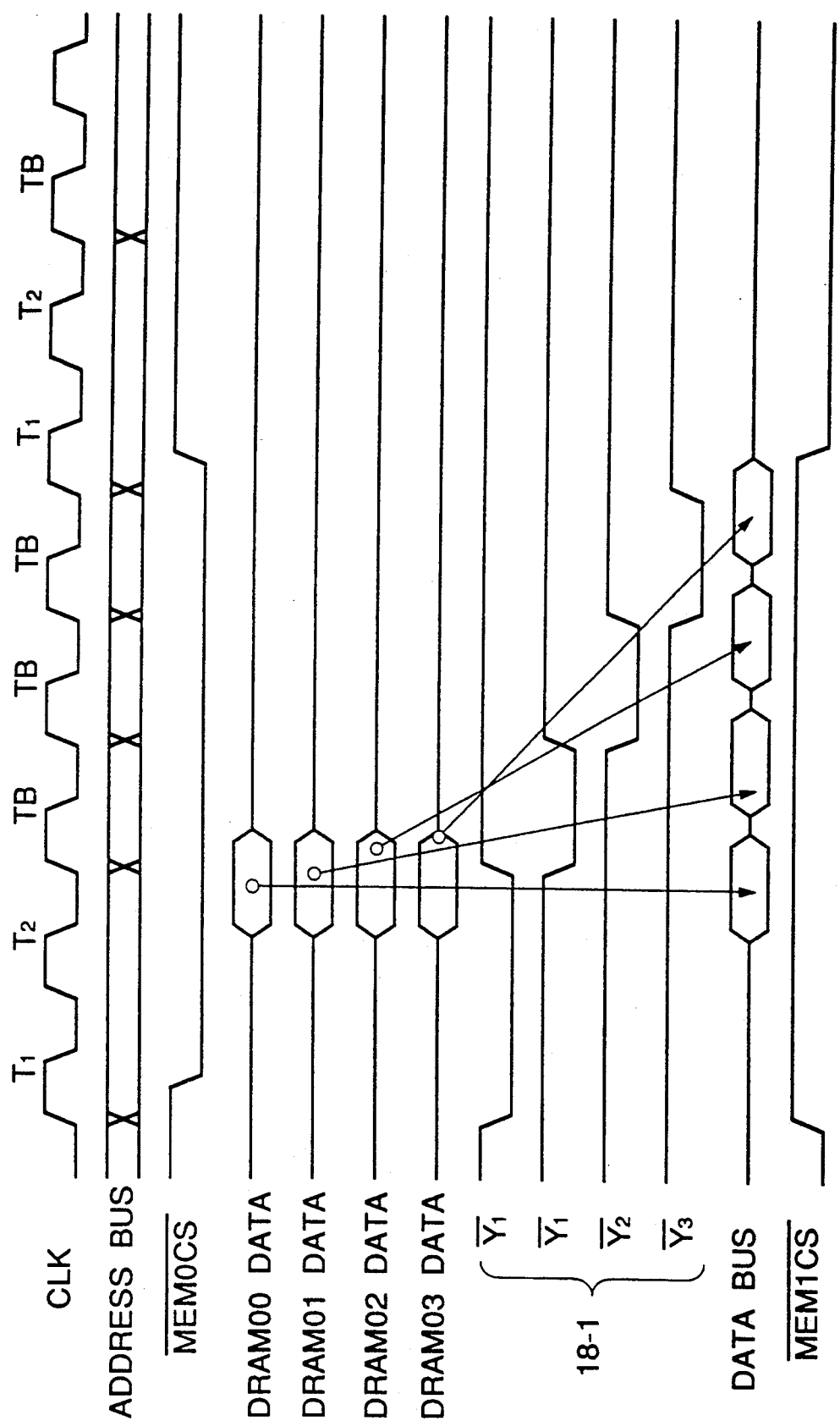
FIG. 10 is a timing chart showing an operation of the data processor shown in FIG. 7, in which four banks of memory are provided and each of the memory banks includes four sub-banks.

Referring to FIG. 10, there is shown a timing chart illustrating the operation of the third embodiment of the data processor shown in FIG. 7.

If the address on the address bus changes at a T1 clock in a first cycle, the address decoder 6 activates the chip select signal $\overline{MEM0CS}$. In response to this signal, the DRAM controllers 19-1 to 19-4 activate the row address strobe $\overline{RAS}$, so that access to the DRAM00 to DRAM03 starts. In response to the address outputted in synchronism to the T1 clock, the $\overline{Y}_0$ output of the selector 22-1 is activated, so that a data exchange between the DRAM00 and the CPU 1 is executed at an end of the T2 clock, namely at a rising of a first TB clock. Similarly, at the first TB clock, the $\overline{Y}_1$ output of the selector 22-1 is activated, so that a data exchange between the DRAM01 and the CPU 1 is executed. The $\overline{Y}_2$ output of the selector 22-1 is activated at the second TB clock, so that a data exchange between the DRAM10 and the CPU 1 is executed. The $\overline{Y}_3$ output of the selector 22-1 is activated at the third TB clock, so that a data exchange between the DRAM11 and the CPU 1 is executed.

In the third embodiment, since the four DRAMs (DRAM00 to DRAM03 or DRAM10 to DRAM13) are driven at the same one-time timing, the DRAM high speed page mode access is not used. Therefore, the DRAMs and the DRAM controllers can be replaced by memories such as ROMs or SRAMs which have a constant access speed.

The invention has thus been shown and described with reference to the specific embodiments. However, it should be noted that the present invention is in no way limited to the details of the illustrated structures but changes and modifications may be made within the scope of the appended claims.

I claim:

1. A data processor with high speed memory access comprising:

a central processing unit (CPU);

an external memory composed of $2^n$ dynamic random access memory (DRAM) banks where $n \geq 2$, data stored in said external memory being divided into blocks of data having a plurality of words and stored in said DRAM banks in an interleaved manner;

a plurality of DRAM controllers, one for each of said DRAM banks, for generating a row address strobe ($\overline{RAS}$), a column address strobe ($\overline{CAS}$) and a write enable ($\overline{WE}$) strobe to control a corresponding one of said DRAM banks;

an address bus connected to said CPU and said plurality of DRAM controllers for supplying an address to said external memory;

an address decoder connected to said address bus for decoding a portion of said address and generating two chip select ($\overline{CS}$) signals for selecting alternate groups of $2^{n-1}$ DRAM banks in said external memory;

a plurality of buffers, one for each of said DRAM banks, connected to receive data from or supply data to a corresponding one of said DRAM banks, data from DRAM banks within a group being simultaneously accessed by one of said $\overline{CS}$ signals;

a data bus connected to said CPU and said plurality of buffers for supplying blocks of data to said external memory and receiving blocks of data from said external memory;

control logic connected to said CPU for generating memory read and memory write signals to said DRAM controllers to control data exchange between the CPU and the external memory; and selecting logic connected to said address bus and responsive to said $\overline{CS}$ signals for generating selection signals to said buffers for sequentially enabling data exchange between said buffers for a group of DRAM banks and said data bus.

2. The data processor recited in claim 1 wherein the number of DRAM banks is four (n=2) and the CPU executes a data exchange with blocks of four words, each DRAM bank having a memory area divided into a number of sub-areas each having continuous addresses, so that the sub-areas of a first pair of DRAM banks and the sub-areas of a second pair of DRAM banks are alternately assigned in continuous addresses in one memory space formed of the four DRAM banks, and when continuous addresses are supplied, the first and second pairs of DRAM banks are alternately accessed by said DRAM controllers, and said selecting logic comprises:

first and second invertors connected to receive ones of said $\overline{CS}$ signals and generate an inverted output signal;

third and fourth invertors connected to receive a selected bit of said address and generate an inverted output signal;

first and second NAND gates each connected to receive the inverted output signal from said first inverter, said first NAND gate also receiving the inverted output signal from said third invertor and said second NAND gate also receiving the selected bit input to said third invertor, said first NAND gate generating an enable signal to a first one of said plurality of buffers and said second NAND gate generating an enable signal to a second one of said plurality of buffers; and third and fourth NAND gates each connected to receive the inverted output signal from said second invertor, said third NAND gate also receiving the inverted output signal from said fourth invertor and said second NAND gate also receiving the selected bit input to said fourth invertor, said third NAND gate generating an enable signal to a third one of said plurality of buffers and said fourth NAND gate generating an enable signal to a fourth one of said plurality of buffers.

3. The data processor recited in claim 1 wherein the number of DRAM banks is eight (n=3) and the CPU executes a data exchange with blocks of four words, each DRAM bank having a memory area divided into a number of sub-areas each having continuous addresses, so that the sub-areas of a first four of DRAM banks and the sub-areas of a second four of DRAM banks are alternately assigned in continuous addresses in one memory space formed of the eight DRAM banks, and when continuous addresses are supplied, the first four and second four DRAM banks are alternately accessed by said DRAM controllers, and said selecting logic comprises:

first and second logic circuits connected to receive respective ones of said $\overline{CS}$ signals and first and second bits (A and B) of said address to generate four output signals ($\overline{Y_0}$, $\overline{Y_1}$, $\overline{Y_2}$, and $\overline{Y_3}$), said first logic circuit controlling a first four of said buffers and said second logic circuit controlling a second four of said buffers, said first and second logic circuits being defined by the following truth table:

| INPUT | | | OUTPUT | | | |
|---|---|---|---|---|---|---|
| $\overline{G}$ | B | A | $\overline{Y_0}$ | $\overline{Y_1}$ | $\overline{Y_2}$ | $\overline{Y_3}$ |
| 0 | 0 | 0 | 0 | 1 | 1 | 1 |
| 0 | 0 | 1 | 1 | 0 | 1 | 1 |
| 0 | 1 | 0 | 1 | 1 | 0 | 1 |
| 0 | 1 | 1 | 1 | 1 | 1 | 0 |
| 1 | 0 | 0 | 1 | 1 | 1 | 1 |
| 1 | 0 | 1 | 1 | 1 | 1 | 1 |
| 1 | 1 | 0 | 1 | 1 | 1 | 1 |
| 1 | 1 | 1 | 1 | 1 | 1 | 1 | where $\overline{G}$ represents one of said $\overline{CS}$ signals.

* * * * *